(12) United States Patent
Wayne

(10) Patent No.: US 6,678,913 B1
(45) Date of Patent: Jan. 20, 2004

(54) APPARATUS AND METHOD FOR CLEANING FILM

(75) Inventor: Rod Wayne, Collingwood (CA)

(73) Assignee: San Lab Systems, Chilliwack (CA)

( * ) Notice: Subject to any disclaimer, the term of this patent is extended or adjusted under 35 U.S.C. 154(b) by 0 days.

(21) Appl. No.: 09/840,604

(22) Filed: Apr. 22, 2001

Related U.S. Application Data

(60) Provisional application No. 60/230,185, filed on Sep. 1, 2000.

(51) Int. Cl.⁷ ................................................. B08B 1/02
(52) U.S. Cl. ........................................................ 15/100
(58) Field of Search ..................... 15/97.1, 100, 256.5, 15/256.6; 352/130; 118/261, 262

(56) References Cited

U.S. PATENT DOCUMENTS

| | | | |
|---|---|---|---|
| 1,334,655 A | | 3/1920 | Handschiegl |
| 1,356,903 A | * | 10/1920 | Borman |
| 1,390,076 A | * | 9/1921 | Bennett |
| 1,933,084 A | * | 10/1933 | Allison |
| 3,158,886 A | * | 12/1964 | Grimes |
| 3,640,293 A | * | 2/1972 | Freedman |
| 3,737,941 A | * | 6/1973 | Miller et al. |
| 3,945,079 A | * | 3/1976 | Westberg |
| 4,138,757 A | | 2/1979 | Henderson et al. |
| 4,145,231 A | * | 3/1979 | Heckman |
| 4,244,078 A | | 1/1981 | Hughes et al. |
| 5,006,875 A | * | 4/1991 | Oemcke et al. |
| 5,361,444 A | | 11/1994 | Theilemann |
| 5,423,104 A | | 6/1995 | West |
| 5,713,102 A | | 2/1998 | Schmitzer et al. |
| 5,991,954 A | | 11/1999 | Kubota et al. |
| 6,223,377 B1 | * | 5/2001 | Leisinger et al. |

OTHER PUBLICATIONS

Safe Handling, Storage, and Destruction of Nitrate–Based Motion Picture Films. (1988) KODAK Publication No. H–182.

* cited by examiner

*Primary Examiner*—Terrence R. Till
(74) *Attorney, Agent, or Firm*—The Bilicki Law Firm, P.C.

(57) ABSTRACT

An apparatus for cleaning film comprising a mounting surface supporting: a first film core for holding film to be cleaned; a first film platter for supporting the first film core; at least one first guide member; at least one first particle transfer roller; at least one first static reducer; a cleaning sub-assembly; at least one pair of buffers; at least one second particle transfer roller; at least one second guide member; a second film core for receiving the film; and a second film platter supporting the second film core. The cleaning sub-assembly is comprised of a pair of drive rollers, a pair of applicators disposed on the drive rollers, a solvent tank to hold a cleaning solution, and a spiral screw within each solvent tank to deliver the cleaning solution to the applicators. The drive rollers and applicators rotate in opposite directions and can also be caused to move laterally.

86 Claims, 7 Drawing Sheets

APPARATUS AND METHOD FOR CLEANING FILM

This nonprovisional patent application claims priority to provisional application Ser. No. 60/230,185, filed Sept. 1, 2000.

FIELD OF INVENTION

The present invention generally relates to an apparatus for cleaning film. Particularly, the invention relates to a non-immersion film cleaning apparatus for removing both dry contaminants as well as grease and oil mottle from film surfaces, and a method for using the same.

DESCRIPTION OF EMBODIMENTS OF THE INVENTION

For the purpose of promoting an understanding of the present invention, reference will be made to embodiments of a film cleaning apparatus as illustrated by the following drawings. It will nevertheless be understood that no limitations of the scope of the invention are thereby intended by such alterations as (I) changing the geometry or any element of the embodiments of the invention, (II) the placement of the various components, or (III) the quantity of each component. It is contemplated that such alterations fall within the spirit and scope of the invention described herein. Some of the possible alterations will be mentioned in the following description.

With particular reference to the drawings, the reader should understand that like numerals in different figures refer to the same elements of the embodiments.

Figure 1A:
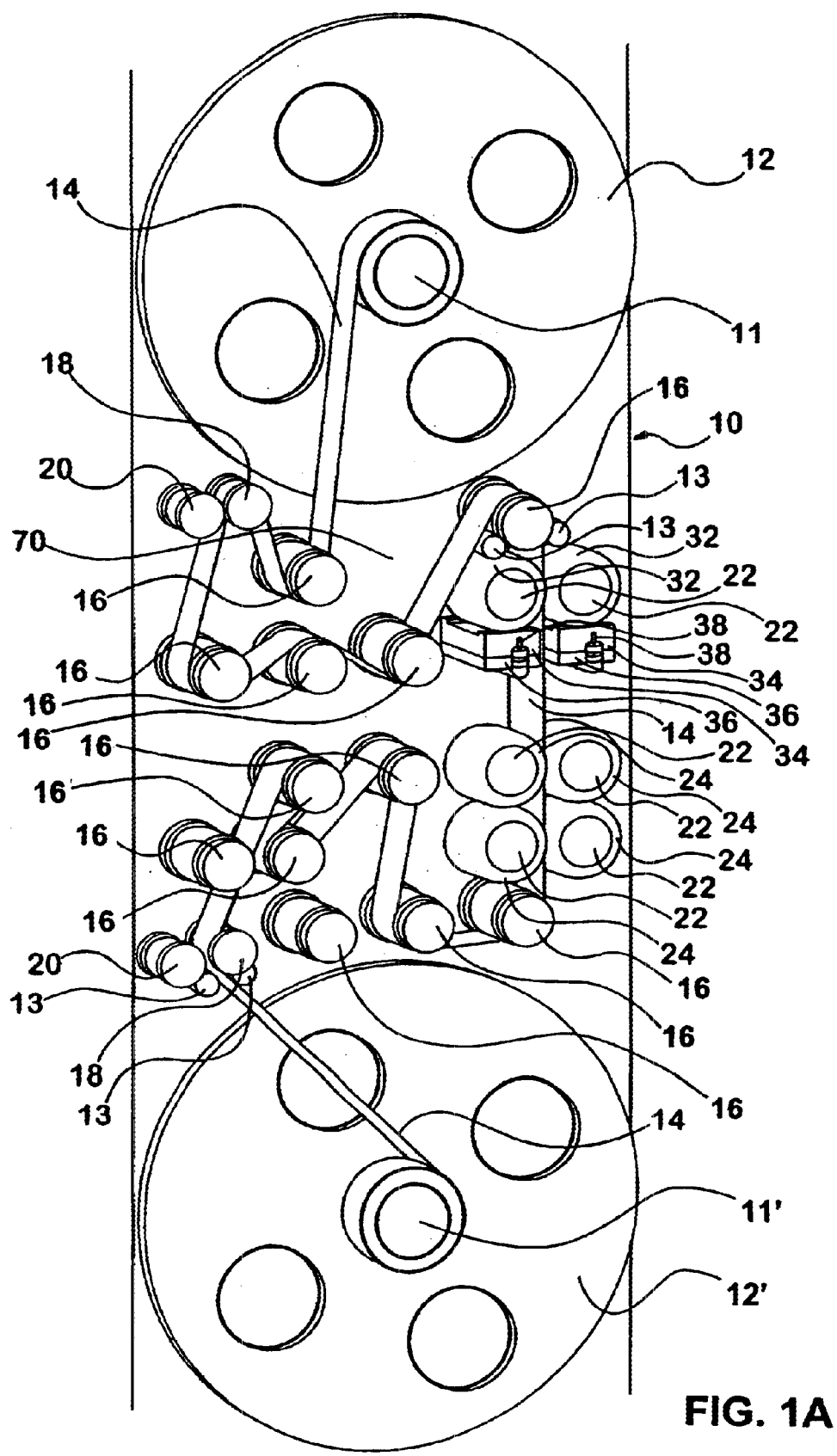
FIG. 1A is a perspective view of one embodiment of the invention cleaning a 35 mm film.
Figure 1B:
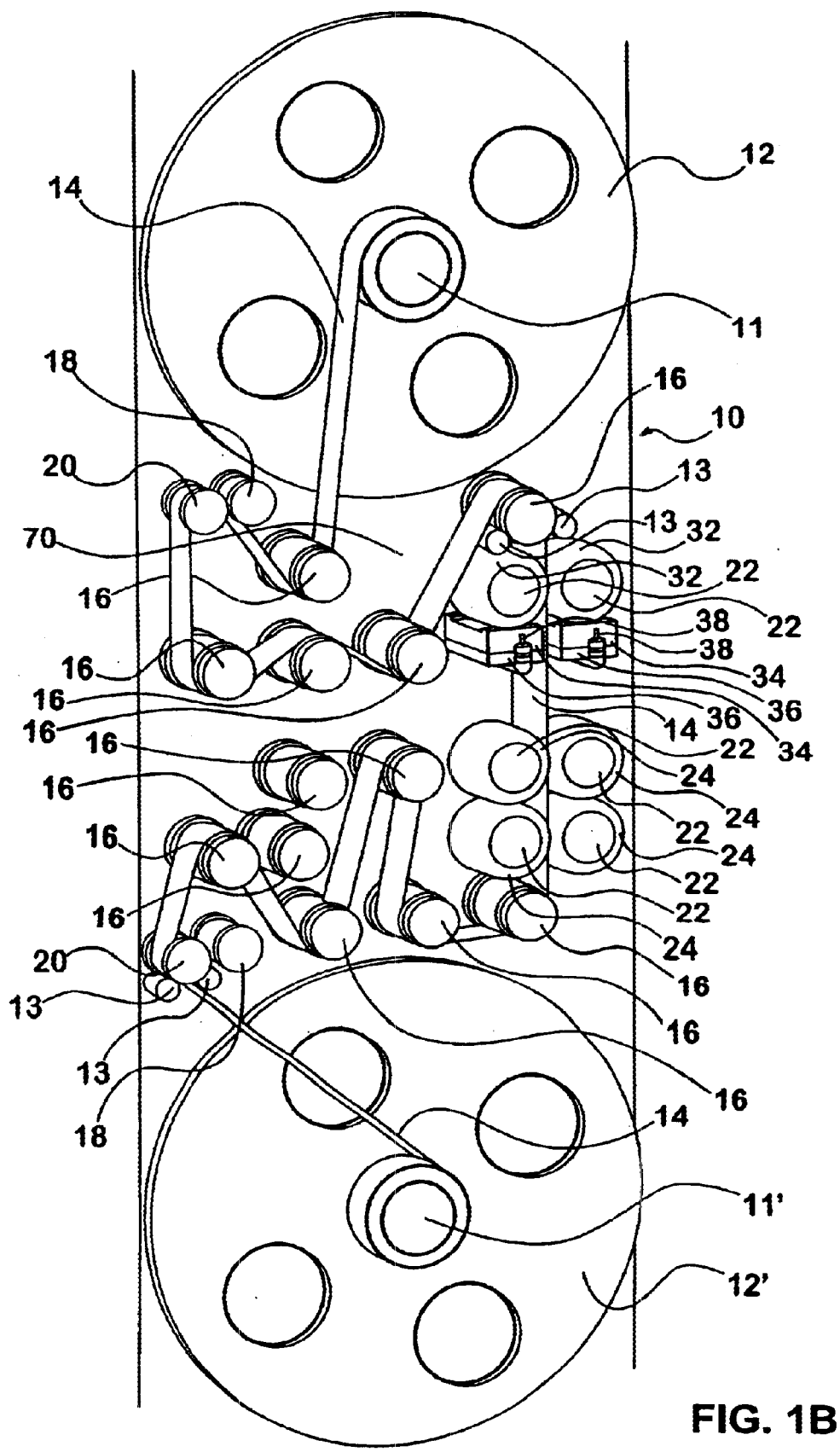
FIG. 1B is a perspective view of one embodiment of the invention cleaning a 16 mm film.

FIGS. 1A and 1B show perspective views of two embodiments of film cleaning apparatus 10 cleaning a 35-mm film and a 16-mm film, respectively. One embodiment of film cleaning apparatus 10 includes mounting surface 70 that is planar. Mounting surface 70 can be wood, plastic, metal, or any other material on which the components can be mounted or otherwise attached. Mounting surface 70 can be a single unit large enough to include all of the components or it can be any number of smaller units attached together. In one alternate embodiment, the mounting surface is comprised of three separate units fastened together. Film cleaning apparatus 10 can also be configured as a cabinet in which all of the components are enclosed and mounting surface 70 is within the cabinet.

Film cleaning apparatus 10, according to the embodiments shown in FIGS. 1A and 1B, includes first film platter 12 and second film platter 12', with first film core 11 and second film core 11', respectively. In this embodiment, first film platter 12, the supply platter, is attached to mounting surface 70 at the uppermost section of film cleaning apparatus 10 and second film platter 12', the take-up platter, is attached to mounting surface 70 at the lowermost section of film cleaning apparatus 10. It is understood, and one of ordinary skill in the art will appreciate, that first film platter 12 and second film platter 12' could be aligned horizontally or need not be aligned at all. In this embodiment, first film platter 12 and second film platter 12' are constructed of an anodized aluminum to prevent the buildup of static electricity. However, other materials known in the art could be used that accomplish the same result.

Film 14 is generally carried on a film core. First film core 11, containing film 14, is removably attached to first film platter 12. Second film core 11' is empty and removably attached to second film platter 12'. In one embodiment, first film core 11 and second film core 11' are of the type primarily manufactured by Kodak®. After film 14 is cleaned using the present invention, it is wound onto second film core 11'.

Figure 2:
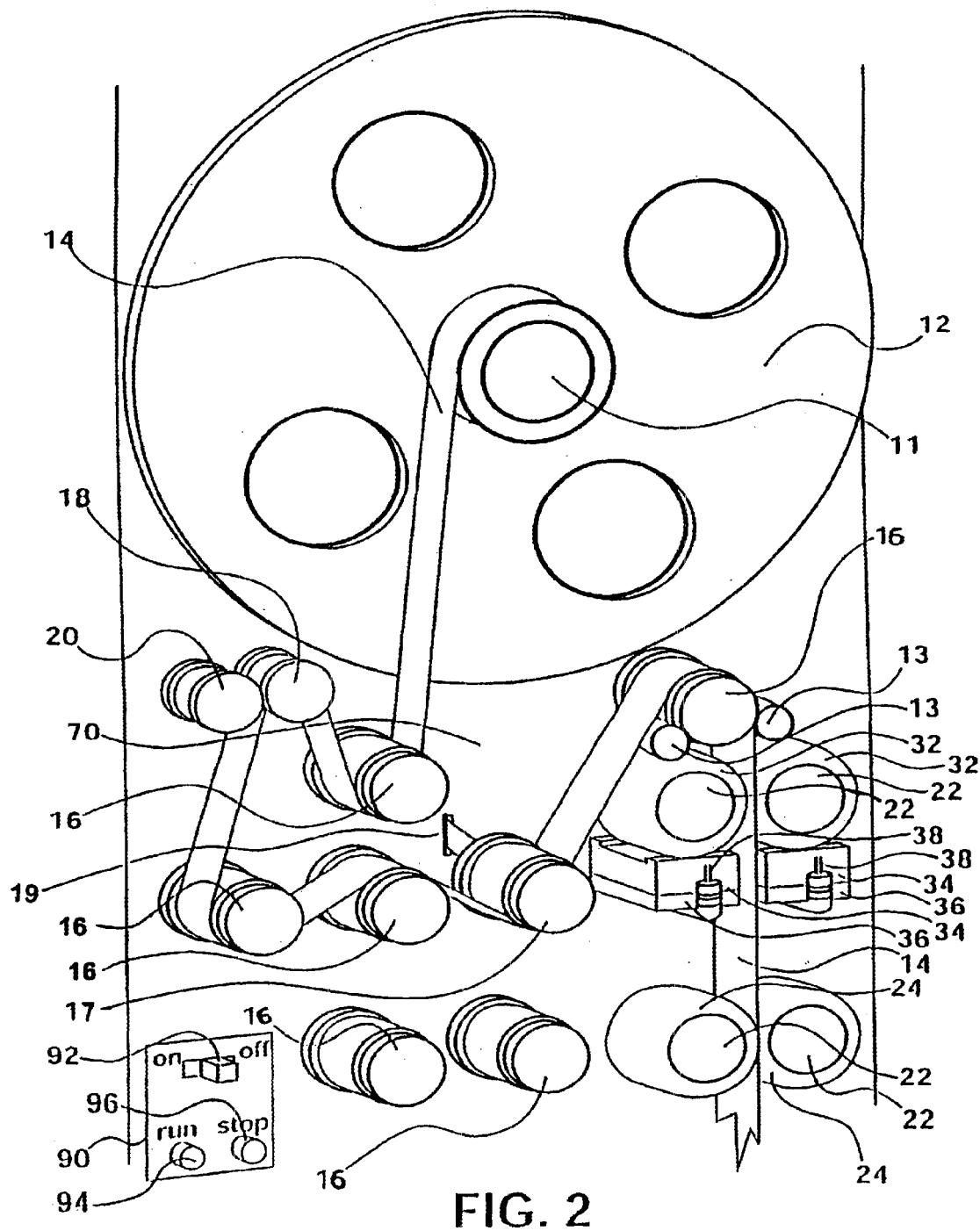
FIG. 2 is an enlarged view of the upper portion of one embodiment of the invention including one embodiment of the control panel.

In this embodiment, both first film platter 12 and second film platter 12' are connected to torque motors (not shown) located on the backside of mounting surface 70 which act as a driving mechanism. In one embodiment, the torque motors are ¼ HP, 90V DC motors manufactured by Baldor. In this embodiment, the torque motor attached to first film platter 12 functions as a bearing block and brake. One of ordinary skill in the art will appreciate that the bearing block and brake could be substituted with another driving mechanism known to one of ordinary skill in the art. As seen in FIG. 2, when stop button 96 located on control panel 90 is activated, it causes a magnetic break in the torque motor that causes the motor to short and stop.

The torque motor, attached to second film platter 12', is electrically driven and provides tension to film 14. In this embodiment, when on/off switch 92 is moved to the "on" position, the torque motor is switched into a holding torque mode. The holding torque mode provides just enough tension to keep film 14 taut. Once run button 94 is activated and film cleaning apparatus 10 is put into run mode, the torque motor is automatically transferred into double torque mode and emits twice the torque as in the holding torque mode. Because film 14 is now being driven towards second film platter 12', the torque needs to be increased in the run mode to avoid spillage of film 14 and to ensure that film 14 is wound tightly around second film core 11', but not so tight as to damage film 14. In another embodiment, film reels can be used instead of first film core 11 and second film core 11'.

To begin the film cleaning process, film 14 is manually fed through film cleaning apparatus 10 as illustrated in FIGS. 1A and 1B. One of ordinary skill in the art will readily recognize that the machine operator could lace film 14 through the components of film cleaning apparatus 10 in any number of different ways.

In one embodiment, film 14 is first guided around particle transfer roller 16, as shown in FIGS. 1A, 1B, and 2. In this embodiment, all particle transfer rollers 16 are of the type manufactured and sold by San Lab Systems, Inc. which can be seen on the San Lab Systems website at SanLabSystems.com. In this embodiment, particle transfer rollers 16 are 1.5 inches in diameter and are constructed of soft polyurethane with a durometer range between approximately 20 and approximately 25. Particle transfer rollers 16 are capable of eliminating a large amount of dust, dirt, lint, fibers, hairs, insects, oil mottle, and other contaminants from film 14 that can result in scratches of film 14. Further, particle transfer rollers 16 are attached to mounting surface 70 so that they spin or rotate freely as film 14 passes around them. One of ordinary skill in the art will recognize that particle transfer rollers 16 could be disbursed throughout film cleaning apparatus 10 in any number of combinations.

In another embodiment, one particle transfer roller 16 is not freely rotatable. In this embodiment, particle transfer roller 16 is attached to a drive motor (not shown). The drive motor in this embodiment is a capstan drive. The drive motor moves film 14 through film cleaning apparatus 10. The speed of the drive motor can be adjusted by altering the voltage supplied thereto so that film 14 passes through the components of film cleaning apparatus 10 at a rate between zero (0) and approximately two hundred (200) feet per minute (or approximately 60 meters per minute). In this embodiment, the drive motor is set to run at 110V AC, and film 14 passes through film cleaning apparatus 10 at a speed between about one hundred seventy-five (175) feet per minute (or about 0.875 meters/second) and about two hundred (200) feet per minute (or about 1 meter/second). The drive motor is set to ramp up to speed. It accelerates slowly so as not to break or otherwise damage film 14. The drive motor is manually started and stopped by run button 94 and stop button 96 located on control panel 90 as shown in FIG. 2. One of ordinary skill in the art will appreciate that any one, or more than one, particle transfer rollers 16 could also be attached to the drive motor.

In addition to being manually stopped and started, the drive motor can alternately be automatically stopped. In the embodiment shown in FIG. 2, particle transfer roller 17 is attached to lever arm 19. Lever arm 19 allows manually fed through film cleaning apparatus 10. As soon as the last bit of film 14 passes particle transfer roller 17, particle transfer roller 17 drops, causing the power to the drive motor to be cut and stops film cleaning apparatus 10. One of ordinary skill in the art will recognize that any of particle transfer rollers 16 can be adapted to perform this function.

In FIG. 2, an enlarged view of the upper portion of film cleaning apparatus 10 can be observed. In this embodiment, control panel 90, which has on/off switch 92, run button 94, and stop button 96 can be appreciated. Control panel 90 can be located in any empty area on mounting surface 70. One of ordinary skill in the art will appreciate that the components of control panel 90 can be arranged in any number of different ways, such as, but not limited to, having an on/off button or a run/stop switch, etc.

From particle transfer roller 16, depending on the size of film 14, film 14 is then guided around either 35 mm guide 18 or 16 mm guide 20. From there, film 14 is guided through a first series of particle transfer rollers 16. In the embodiment shown, there are four particle transfer rollers 16, such that film 14 moves alternately over and under particle transfer rollers 16. One of ordinary skill in the art will appreciate that film 14 need not alternate over and under particle transfer rollers 16 and that there could be zero (0) to an almost unlimited number of particle transfer rollers 16 for film 14 to pass over and around. However, at least one particle transfer roller 16 should be used to remove contaminants before film 14 reaches the cleaning solution to reduce the likelihood of scratching film 14.

Figure 3:
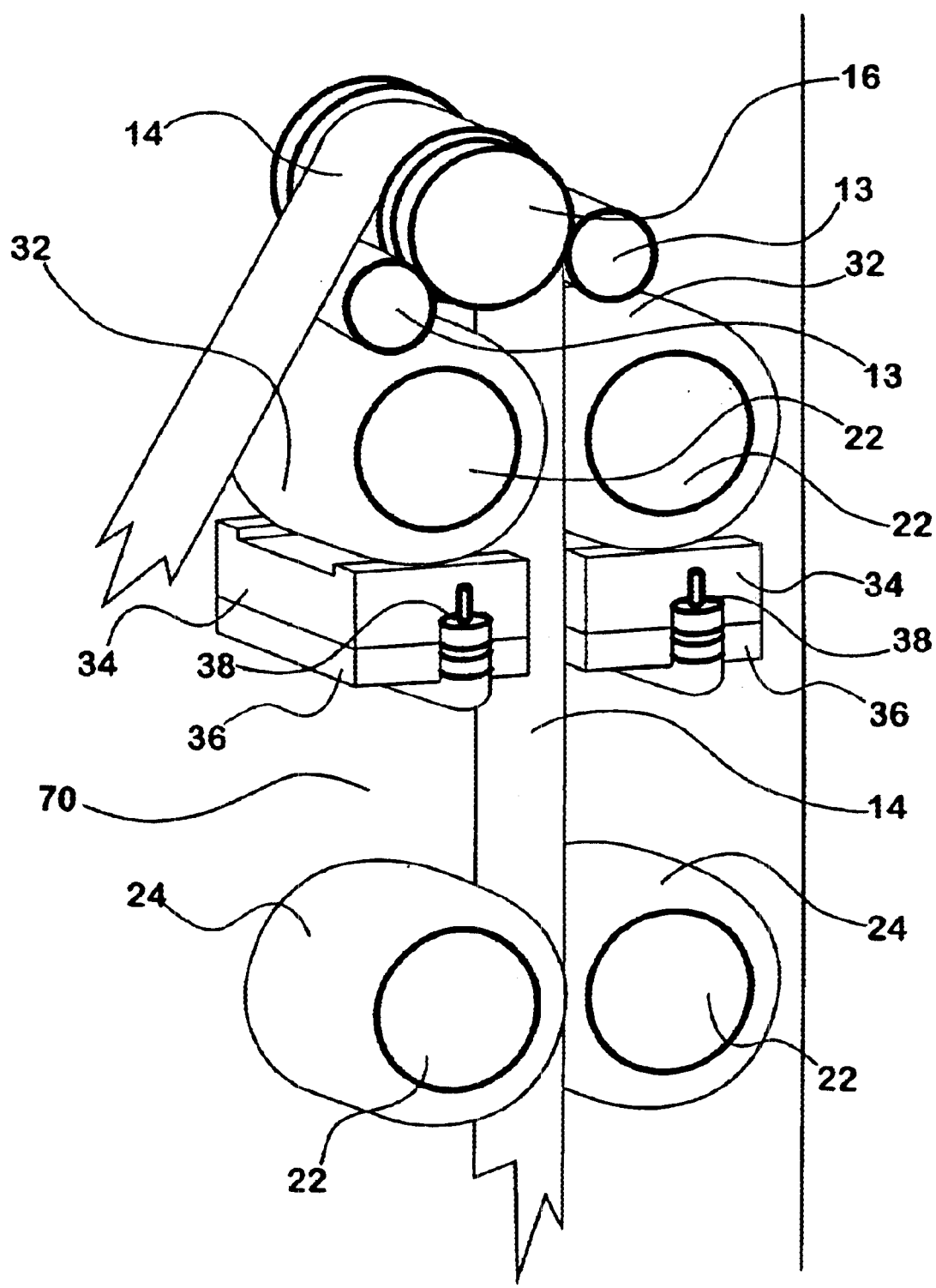
FIG. 3 is an enlarged view of the non-immersion cleaning sub-assembly.

It can be better appreciated in FIG. 3 that film 14 is next guided past, and adjacent to, a pair of static reducers 13. In the embodiment shown in FIG. 3, one static reducer 13 is located on each side of film 14. Static reducers 13 ionize the air in the area so that any static energy is dissipated. In one embodiment, static reducers 13 are Static Masters® of the type manufactured by NRD, Inc., Model No. 1U400. One of ordinary skill in the art will readily recognize that other methods can be used to eliminate static electricity from film 14. One possible alternative is humidifying the air around film cleaning apparatus 10 to reduce the electrical charge.

Figure 6:
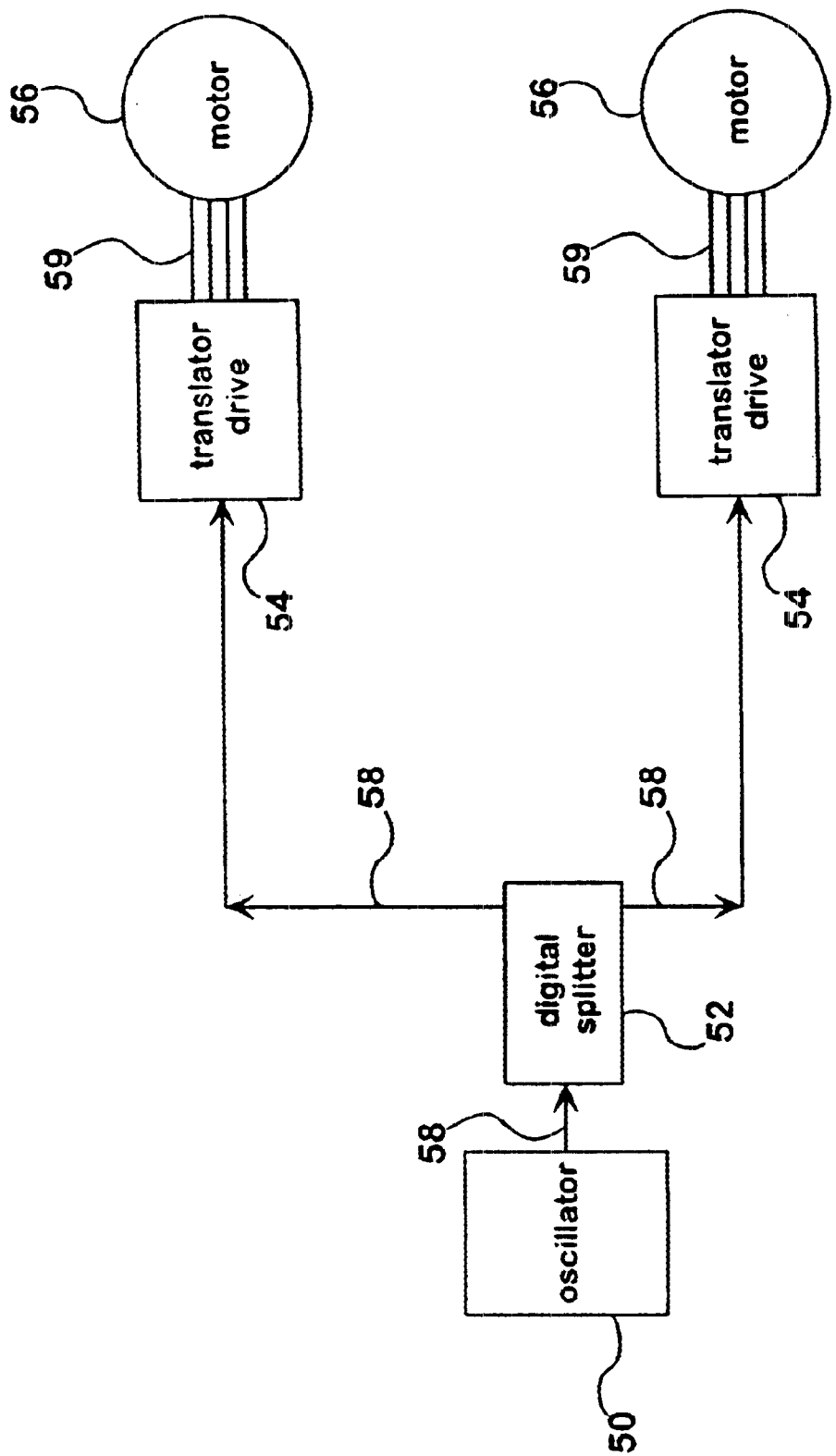
FIG. 6 is a flow chart showing one method used to achieve pulsed rotation of the drive rollers and applicators.

Film 14 then passes through a non-immersion cleaning sub-assembly. In the embodiment shown in FIGS. 1A through 3, the sub-assembly is comprised of a pair of applicators 32 each on one of a pair of drive rollers 22 and one of a pair of solvent tanks 34 below each applicator 32, to remove grease, oil mottle and other residues and contaminants. In one embodiment, drive rollers 22 are made of an aluminum and steel alloy, and applicators 32 are made of a soft, lint and oil free, synthetic material. In another embodiment of the invention, applicators 32 are made of polyester. However, any such material can be used. Natural fiber applicators should not be used because they may contain lint and/or oils that hinder film cleaning. Film 14 is fed between and is contacted by applicators 32 that are removably attached to drive rollers 22. Drive rollers 22 are attached to a motor on the reverse side of mounting surface 70 and are constructed of an aluminum and steel alloy in this embodiment. Drive rollers 22 are rotated in steps, with the applicators 32 attached, and turn in opposite directions with the right roller turning clockwise and the left roller turning counter clockwise such that the surface of each applicator 32 rotates against the direction film 14 is passing. One of ordinary skill in the art, however, will appreciate that the operator could alter the rotational directions of drive rollers 22. In this embodiment, a pair of electronic step motors 56 (as shown in FIG. 6) drives drive rollers 22. Step motors 56 are located on the rear plane of mounting surface 70. Each drive roller 22 is secured to a shaft of the corresponding electronic step motor 56 and rotates a portion of a full rotation, pauses, rotates another portion of a full rotation, pauses, etc. For example, each drive roller 22 rotates one sixteenth of a rotation, pausing between each partial rotation at a speed of one complete rotation per second. The effect of this step or partial pulsing rotation is to create a sonic agitation.

As shown in FIG. 6, oscillator 50 generates pulsed electrical signal 58, which is transmitted to digital splitter 52 via electrical cables (not shown) that separates signal 58 into two identical signals 58 of the same frequency, which is also identical to the frequency of signal 58 generated by oscillator 50. In one embodiment, a 7406 hex driver is used as digital splitter 52, and oscillator 50 is a 555-timer chip that is capable of generating electrical signals of varying frequencies. In another embodiment, oscillator 50 is further set in a monostable, as opposed to an astable, mode. In this embodiment, oscillator 50 generates signals 58 with frequencies varying between approximately 10 Hz and approximately 1 KHz. In another embodiment, oscillator 50 generates an approximately 100 Hz signal at approximately 500 pulses per minute. In this embodiment, signals 58 emanating from digital splitter 52 are transmitted to translator drive 54 at 500 pulses per minute. Signal 58 then enters translator drive 54, which translates signal 58 into pulsed signals 59. Electronic step motor 56 receives pulsed signals 59 and rotates drive rollers 22 in the manner previously provided. In one embodiment, translator drive 54 is of the type manufactured and sold by Warner Electric, model No. SS2000MD4. In another embodiment, electronic step motors 56 are of the type manufactured and sold by the Superior Electric Co. under the trademark Slo-Syn®, Model KML061F05. In this embodiment, electronic step motors 56 rotate drive rollers 22 in approximately degree pulsing increments when operating in full-step mode and 0.9 degree pulsing increments when operating in half-step mode for a set number of steps per second. In order to achieve a rotation speed of 60 rpm (or 1 revolution per second), drive rollers 22 would have to be rotated at 400 pulses per second when operating at half-step mode (i.e., 0.9 degrees of rotation per pulse) or 200 pulses per second when operating at full-step mode (i.e., 1.8 degrees of rotation per pulse. The speed of electronic step motors 56 can be adjusted, which will vary the degree of pulsed incremental movements of drive rollers 22.

In another embodiment, drive rollers 22 with applicators 32 disposed thereon, as shown in FIG. 2, in addition to rotating in a step manner, move laterally, relative to mounting surface 70 to provide a further means of cleaning film 14. In one embodiment, the step motor is constructed with holding magnets of alternating polarity located on a wheel and rotated by the motor. Another magnet is disposed at the end of a piston, and each piston is attached to driver roller 22. As the motor wheel rotates, alternating positive and negative magnets rotate past the piston magnets and attract and repel the pistons which in turn causes each applicator to scrub laterally against film 14 as film 14 passes between applicators 32. The step motors also transmit rotary motion through gears to drive rollers 22, providing both the step rotation and the lateral movement. The motor can also be adapted to transmit rotary motion through the gears to shafts attached to static reducers 13 and/or to spiral screws 40 (described below), allowing them to also turn as film 14 passes through the sub-assembly. The magnets may be attached to the pistons by welds, solder, adhesive or other attachment methods which are well known to those skilled in the art. One of ordinary skill in the art will recognize that many other means of providing the lateral movement to drive rollers 22 can be used.

Figure 4:
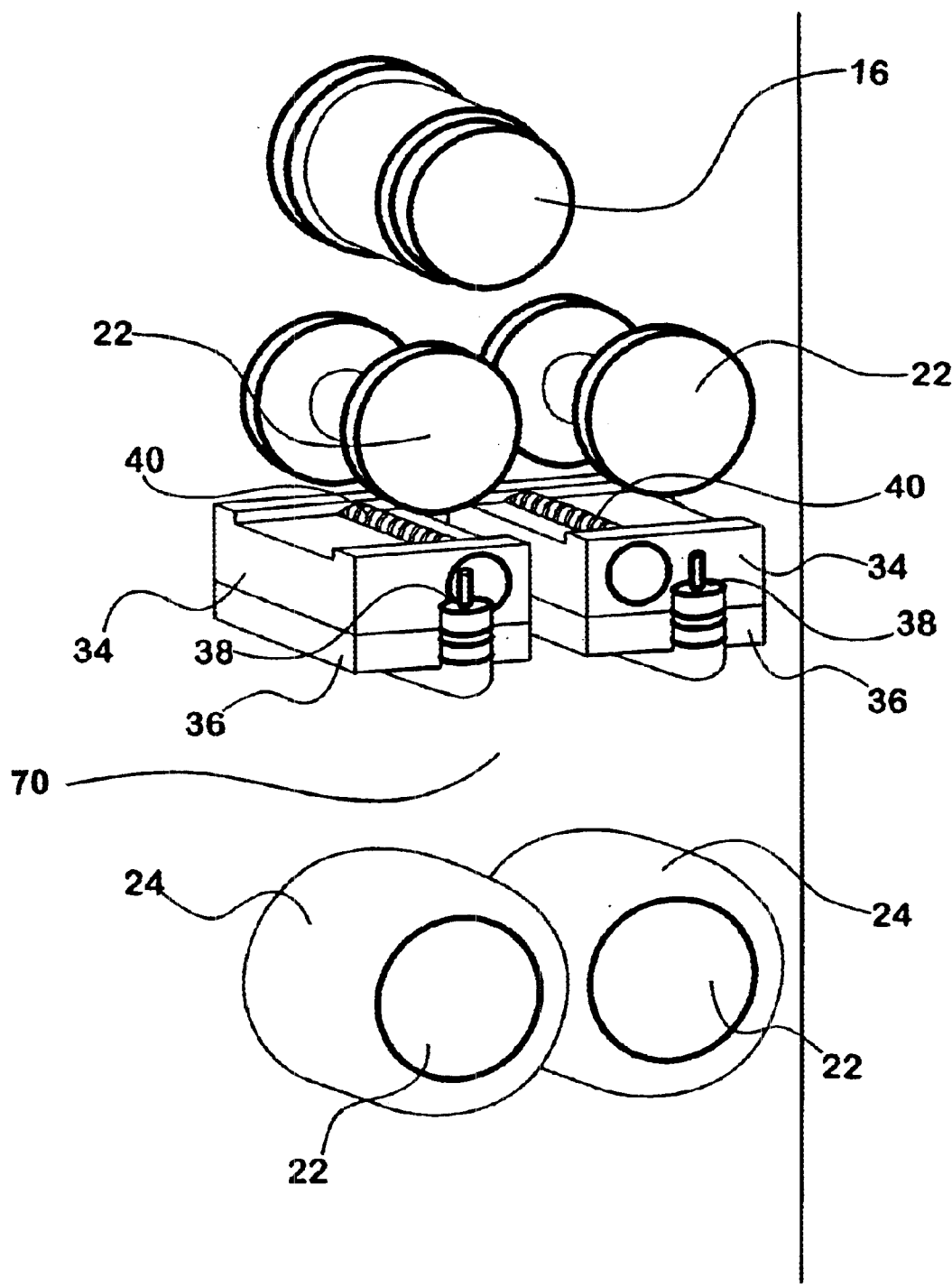
FIG. 4 is an enlarged view of the non-immersion cleaning sub-assembly with the applicators removed, showing the drive roller and a spiral screw within each of the solvent tanks.

In FIGS. 3 and 4, it can be observed that located beneath each drive roller 22 is solvent tank 34 that holds cleaning solution. In one embodiment, the cleaning solution is hydrotreated naphtha (hydronaphtha), such as that produced by San Lab Systems or Signal Hydronaphtha, as manufactured by Signal, Inc. Heating blocks 36 located directly underneath each solvent tank 34, heat the cleaning solution. In one embodiment, heating blocks 36 are conductively heated by a heating mechanism (not shown). Various methods of conductive heating are well-known to those familiar with the art.

In this embodiment, the hydrotreated naphtha is kept at a temperature of approximately 26–30° C. (78–86° F.). One of ordinary skill in the art will recognize that other cleaning solutions such as Isopropanol and HFE 8200 3M® can be used in place of the hydrotreated naphtha and that different solutions may not need to be heated.

One embodiment of a cleaning solution delivery system is to store the cleaning solution in an inverted bottle located on the back of mounting surface 70. This method gravity feeds the cleaning solution to solvent tanks 34 through a tubing. Solvent tank 34 is constructed of an anodized aluminum and the cleaning solution is maintained at a constant level within solvent tanks 34. In this embodiment, the inverted bottle is constructed of plastic and the tubing is constructed of stainless steel. The construction of the tubing and the inverted bottle may vary depending on the cleaning solution used. Each solvent tank 34 is self-leveling so that when the level of the solvent drops below a certain point, an air bubble is expelled causing the inverted bottle to release additional cleaning solution. In another embodiment, the cleaning solution is maintained at a level corresponding to one half of the capacity of solvent tank 34. A pair of hose adapters 38 located on solvent tanks 34 allows a user to determine the level of the cleaning solution within solvent tank 34.

Figure 5:
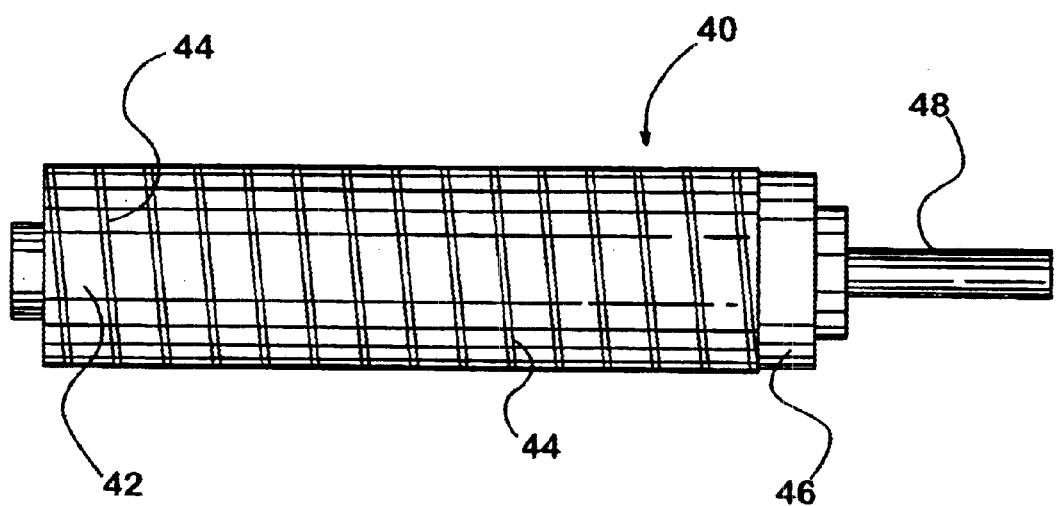
FIG. 5 is an enlarged view of the spiral screw.

Within each solvent tank 34 of one embodiment of the invention is spiral screw 40, as shown in FIG. 4. FIG. 5 provides a more detailed view of one embodiment of spiral screw 40 which is comprised of metal cylinder 42 with one continuous helical groove 44 cut into the outer surface, spacer 46, and shaft 48. In this embodiment, spiral screws 40 are constructed of brass. The continuous helical groove 44 begins at one end of metal cylinder 42 and ends at the opposite end. In another embodiment, each spiral screw 40 is set partially inside solvent tanks 34 such that each spiral screw 40 is partially submerged in the cleaning solution, and as it rotates, draws cleaning solution up along helical groove 44 to be transferred to applicators 32. In one embodiment, shaft 48 is attached to the same motor that drives drive rollers 22 and rotates spiral screw 40 at approximately 60 rpm. Alternately, spiral screw 40 is driven by a separate motor; for example, a Baldor motor, model No. GP323111. The rotation, in combination with helical groove 44, allows spiral screw 40 to act like a wick, drawing the cleaning solution up out of solvent tanks 34 and onto applicators 32. Applicators 32, which are rotatably stepped along with the drive rollers 22 in one embodiment, as detailed above, then transfer the cleaning solution to film 14 in a gentle scrubbing manner.

In one embodiment, film 14 is then passed through two pairs of drive rollers 22 with buffers 24 removably attached to each individual drive roller 22. The two pairs of drive rollers 22 and buffers 24 dry and polish film 14. Drive rollers 22 are rotated at a high rate of speed by motors located on the backside of mounting surface 70. The right drive rollers 22 rotate clockwise and the left drive rollers 22 rotate counter-clockwise in this embodiment. It can be appreciated that additional pairs of drive rollers 22 and buffers 24 can be added for three pairs or more, or that only one pair of drive rollers 22 and buffers 24 can be used. Furthermore, buffers 24 can be made of the same material that applicators 32 are made of, or any other material that provides similar cleaning characteristics. In this embodiment, drive rollers 22 and buffers 24 rotate smoothly.

Film 14 is then guided through a second series of particle transfer rollers 16. This second series finalizes the cleaning process of film 14. In the embodiment shown, the second series of particle transfer rollers 16 is composed of seven (7) particle transfer rollers 16. Once more it can be appreciated by one of ordinary skill in the art, however, that the number of particle transfer rollers 16 in the second series can vary from zero to virtually any number, and the order in which film 14 is passed through them can vary upon preference of the operator. After passing through the second series of particle transfer rollers 16, film 14 is guided over a second 16 mm guide 20 or 35 mm guide 18, depending on the size of film 14, passes by an optional second set of static reducers 13, one on each side of film 14, and is finally loaded onto second film core 11', that can be removed once the cleaning process is completed.

Although several embodiments for carrying out the present invention have been shown and described herein, it will be apparent that further modifications and variations may be made without departing from what is regarded as the subject matter of the invention.

What it is claimed is:

1. An apparatus for cleaning a film comprising:
   a first film platter for supporting said film and operatively connected to a first driving mechanism;
   at least one first guide;
   at least one first particle transfer roller;
   at least one first static reducer;
   a non-immersion cleaning sub-assembly, wherein said film passes through said non-immersion cleaning sub-assembly after passing around said at least on first guide, around each of said at least one first static reducer, and adjacent to said at least one first static reducer;
   at least one pair of buffers, wherein said film passes between each pair of said at least one pair of buffers after passing through said non-immersion cleaning sub-assembly;
   at least one second particle transfer roller, wherein said film passes around each of said at least one second particle transfer roller after passing between each pair of said at least one pair of buffers;
   at least one second guide, wherein said film passes around said at least one second guide after passing between each pair of said at least one pair of buffers;
   at least one second static reducer, wherein said film passes adjacent to said at least one second static reducer after passing between each pair of said at least one pair of buffers; and
   a second film platter for supporting said film, said second film platter operatively connected to a second driving mechanism.

2. The apparatus of claim 1 further including a mounting surface, wherein said first film platter, said at least one first guide, said at least one first particle transfer roller, said at least one first static reducer, said non-immersion cleaning sub-assembly, said at least one pair of buffers, said at least one second particle transfer roller, said at least one second guide, said at least one second static reducer, and said second film platter are arranged on said mounting surface.

3. The apparatus of claim 2, wherein said apparatus further includes a control panel on said mounting surface, said control panel comprised of an on/off switch, a run button, and a stop button.

4. The apparatus of claim 2, wherein said mounting surface is substantially planar.

5. The apparatus of claim 2, wherein said mounting surface is made of a material selected from a group comprised of wood, plastic, and metal.

6. The apparatus of claim 1, wherein said first driving mechanism is a torque motor acting as a bearing block and break.

7. The apparatus of claim 1, wherein said second driving mechanism is an electrically driven torque motor.

8. The apparatus of claim 1, wherein said first film platter and said second film platter are made of an anodized aluminum.

9. The apparatus of claim 1, wherein said at least one first guide and said at least one second guide for guiding a 35 mm film.

10. The apparatus of claim 1, wherein said at least one first guide and said at least one second guide for guiding a 16 mm film.

11. The apparatus of claim 1, wherein each of said at least one first particle transfer roller and each of said at least one second particle transfer roller are made of polyurethane.

12. The apparatus of claim 1, wherein at least one of said at least one first particle transfer roller and said at least one second particle transfer roller is operatively connected to a motor to control a speed of said film passing through said apparatus.

13. The apparatus of claim 12, wherein said speed of said film is between approximately 175 feet per minute and approximately 200 feet per minute.

14. The apparatus of claim 1, wherein said non-immersion cleaning sub-assembly is comprised of:
   a pair of drive rollers, each of said pair of drive rollers is operatively connected to a step motor to incrementally rotate said pair of drive rollers at a speed to produce a sonic agitation;
   a pair of applicators each removably mounted on one of said pair of drive rollers;
   a pair of solvent tanks, each of said pair of solvent tanks adapted to hold a cleaning solution and located below one of said pair of drive rollers; and
   a pair of spiral screws, each of said pair of spiral screws located within one of said pair of solvent tanks and adapted to deliver said cleaning solution to one of said pair of applicators.

15. The apparatus of claim 14 wherein each of said pair of drive rollers incrementally rotates at pulsed increments of 1.8 degrees per pulsed increment when operating in full-pulsed mode and at 0.9 degrees per pulsed increment when operating in half-pulsed mode.

16. The apparatus of claim 14, wherein said step motor further provides a lateral movement of each of said pair of drive rollers.

17. The apparatus of claim 14, wherein said apparatus is further comprised of:
   an oscillator for generating an electrical signal;
   a digital splitter for splitting said electrical signal; and
   a translator drive for receiving said electrical signal from said digital splitter and controlling a rotation speed of said pair of drive rollers.

18. The apparatus of claim 17, wherein said oscillator generates a plurality of signals with varying frequencies between approximately 10 Hz and approximately 1 kHz.

19. The apparatus of claim 17, wherein said oscillator generates a signal with a varying frequency of about 100 Hz at approximately 500 pulses per minute.

20. The apparatus of claim 14, wherein each of said pair of drive rollers are made of an aluminum and steel alloy.

21. The apparatus of claim 14, wherein each of said pair of applicators is made of a lint-free and oil-free synthetic material.

22. The apparatus of claim 14, wherein each of said pair of solvent tanks are made of an anodized aluminum.

23. The apparatus of claim 14, wherein each of said pair of solvent tanks are heated via a heating block.

24. The apparatus of claim 14, wherein said apparatus further includes a cleaning solution delivery system comprised of a reservoir for storing said cleaning solution and a tubing for delivering said cleaning solution from said reservoir to said pair of solvent tanks.

25. The apparatus of claim 24, wherein said reservoir is a plastic bottle and said tubing is made of a stainless steel.

26. The apparatus of claim 24, wherein said cleaning solution is selected from a group comprising hydrotreated naphtha, isopropanol, and HFE 8200.

27. The apparatus of claim 24, wherein said cleaning solution is heated to a temperature between approximately 26° C. and approximately 30° C.

28. The apparatus of claim 14, wherein each of said pair of solvent tanks are self-leveling.

29. The apparatus of claim 14, wherein each of said pair of spiral screws is comprised of a metal cylinder with a first end and a second end, a helical groove along said metal cylinder, a spacer at said first end of said metal cylinder, and a shaft protruding from said spacer, operatively engaging a motor.

30. The apparatus of claim 14, wherein said spiral screw is made of brass.

31. The apparatus of claim 1, wherein said second film platter is operatively coupled to an electrically driven torque motor.

32. The apparatus of claim 1, wherein at least one of said at least one first particle transfer roller and said at least one second particle transfer roller is mechanically coupled to an electrically driven torque motor via a lever arm to automatically stop said electrically driven torque motor when said film has finished passing said at least one particle transfer roller mechanically coupled to said electrically driven torque motor.

33. The apparatus of claim 1, wherein each of said at least one pair of buffers are each made of a polyester.

34. The apparatus of claim 1, wherein said at least one first static reducer and said at least one second static reducer ionizes air immediately surrounding said at least one first static reducer and said at least one second static reducer, respectively.

35. A film cleaning apparatus comprising:
a driving mechanism for moving a film through said film cleaning apparatus;
a first film platter for supporting said film and operatively connected to said driving mechanism;
at least one first guide for guiding said film;
at least one first particle transfer roller for removing at least one contaminant from said film;
at least one first static reducer for removing static electricity from said film;
a non-immersion cleaning sub-assembly for cleaning said film, wherein said film passes through said non-immersion cleaning sub-assembly after passing around said at least one first guide, around each of said at least one first particle transfer roller, and in adjacent to said at least one first static reducer, said cleaning sub-assembly comprised of:
a pair of drive rollers;
a pair of applicators, each of said pair of applicators mounted on one of said pair of drive rollers;
a pair of solvent tanks, each of said pair of solvent tanks adapted to hold a cleaning solution and located beneath, and in functional contact with, one of said pair of applicators; and
a pair of spiral screws, each of said pair of spiral screws located within one of said pair of solvent tanks and adapted to deliver said cleaning solution to one of said pair of applicators;
at least one pair of buffers for drying and polishing said film, wherein said film passes between each pair of said at least one pair of buffers after passing through said non-immersion cleaning sub-assembly;
at least one second particle transfer roller for removing said one or more contaminants from said film, wherein said film passes around each of said at least one second particle transfer roller after passing between each pair of said at least one pair of buffers;
at least one second guide for guiding said film, wherein said film passes around said at least one second guide after passing between each pair of said at least one pair of buffers; and
a second film platter for supporting said film, and connected to said driving mechanism.

36. The apparatus of claim 35 further including a mounting surface, wherein said first film platter, said at least one first guide, said at least one first particle transfer roller, said at least one first static reducer, said non-immersion cleaning sub-assembly, said at least one pair of buffers, said at least one second particle transfer roller, said at least one second guide, and said second film platter are arranged on said mounting surface.

37. The apparatus of claim 36, wherein said apparatus further includes a control panel on said mounting surface, said control panel comprised of an on/off switch, a run button, and a stop button.

38. The apparatus of claim 36, wherein said mounting surface is substantially planar.

39. The apparatus of claim 36, wherein said mounting surface is made of a material selected from a group comprised of wood, plastic, and metal.

40. The apparatus of claim 35, wherein said driving mechanism is a torque motor operatively coupled to said first film platter acting as a bearing block and break and an electrically driven torque motor operatively coupled to said second film platter.

41. The apparatus of claim 35, wherein said first film platter and said second film platter are made of an anodized aluminum.

42. The apparatus of claim 35, wherein said at least one first guide and said at least one second guide are adapted to receive a 35 mm film.

43. The apparatus of claim 35, wherein said at least one first guide and said at least one second guide are adapted to receive a 16 mm film.

44. The apparatus of claim 35, wherein each of said at least one first particle transfer roller and each of said at least one second particle transfer roller are made of a polyurethane.

45. The apparatus of claim 35, wherein at least one of said at least one first particle transfer roller and said at least one second particle transfer roller is operatively connected to a motor to control a speed of said film passing through said apparatus.

46. The apparatus of claim 45, wherein said speed of said film is between approximately 175 feet per minute and approximately 200 feet per minute.

47. The apparatus of claim 35, wherein each of said pair of drive rollers is operatively connected to a step motor to incrementally rotate said pair of drive rollers in a plurality of pulsed increments to produce a sonic agitation.

48. The apparatus of claim 47, wherein each of said pulsed increments is selected from a group comprising 0.9 degrees and 1.8 degrees per said pulsed increment.

49. The apparatus of claim 47, wherein said step motor further provides a lateral movement of each of said pair of drive rollers.

50. The apparatus of claim 35, wherein said apparatus is further comprised of:
an oscillator for generating an electrical signal;
a digital splitter for splitting said electrical signal; and
a translator drive for receiving said electrical signal from said digital splitter and controlling a rotation speed of said pair of drive rollers.

51. The apparatus of claim 50, wherein said oscillator generates a plurality of signals with varying frequencies between approximately 10 Hz and approximately 1 kHz.

52. The apparatus of claim 50, wherein said oscillator generates a signal with a varying frequency of about 100 Hz at approximately 500 pulses per minute.

53. The apparatus of claim 35, wherein each of said pair of drive rollers are made of an aluminum and steel alloy.

54. The apparatus of claim 35, wherein each of said pair of applicators is made of a lint-free and oil-free synthetic material.

55. The apparatus of claim 35, wherein each of said pair of solvent tanks are made of an anodized aluminum.

56. The apparatus of claim 35, wherein each of said pair of solvent tanks are heated via a heating block.

57. The apparatus of claim 35, wherein said apparatus further includes a cleaning solution delivery system comprised of a reservoir for storing said cleaning solution and a tubing for delivering said cleaning solution from said reservoir to said pair of solvent tanks.

58. The apparatus of claim 57, wherein said reservoir is a plastic bottle and said tubing is made of a stainless steel.

59. The apparatus of claim 35, wherein said cleaning solution is selected from a group comprising hydrotreated naphtha, isopropanol, and HFE 8200.

60. The apparatus of claim 35, wherein said cleaning solution is heated to a temperature between approximately 26° C. and approximately 30° C.

61. The apparatus of claim 35, wherein each of said pair of solvent tanks are self-leveling.

62. The apparatus of claim 35, wherein each of said pair of spiral screws is comprised of a metal cylinder with a first end and a second end, a helical groove along said metal cylinder, a spacer at said first end of said metal cylinder, and a shaft protruding from said spacer, operatively engaging a motor.

63. The apparatus of claim 35, wherein said spiral screw is made of brass.

64. The apparatus of claim 35, wherein said second film platter is coupled to an electrically driven torque motor.

65. The apparatus of claim 35, wherein at least one of said at least one first particle transfer roller and said at least one second particle transfer roller is mechanically coupled to an electrically driven torque motor via a lever arm to automatically stop said electrically driven torque motor when said film has finished passing said at least one particle transfer roller mechanically coupled to said electrically driven torque motor.

66. The apparatus of claim 35, wherein each of said at least one pair of buffers are each made of a polyester.

67. The apparatus of claim 35, further including at least one second static reducer located between said at least one second guide and said second film platter.

68. The apparatus of claim 67, wherein said at least one first static reducer ionizes air immediately surrounding said at least one first static reducer, and said at least one second static reducer ionizes air immediately surrounding said at least one second static reducer.

69. A non-immersion cleaning sub-assembly comprised of:
a pair of drive rollers operatively connected to a motor to rotate each of said pair of driver rollers;
a pair of applicators, each of said pair of applicators removably mounted on one of said pair of drive rollers;
a pair of solvent tanks, each of said pair of solvent tanks adapted to hold a cleaning solution and located beneath, and in functional contact with, one of said pair of applicators; and
a pair of spiral screws, each of said pair of spiral screws located within one of said pair of solvent tanks and adapted to deliver said cleaning solution to one of said pair of applicators.

70. The sub-assembly of claim 69, wherein said motor is a step motor to incrementally rotate each of said pair of drive rollers.

71. The apparatus of claim 70, wherein said step motor incrementally rotates each of said pair of drive rollers in pulsed increments of 0.9 degrees when operating in half-step mode and 1.8 degrees when operating in full-pulsed mode.

72. The sub-assembly of claim 70, wherein each of said pair of drive rollers are also moved in a lateral direction.

73. The sub-assembly of claim 69, wherein said apparatus is further comprised of:
an oscillator for generating an electrical signal;
a digital splitter for splitting said electrical signal; and
a translator drive for receiving said electrical signal from said digital splitter and controlling a rotation speed of said pair of drive rollers.

74. The sub-assembly of claim 73, wherein said oscillator generates a plurality of signals with varying frequencies between approximately 10 Hz and approximately 1 kHz.

75. The sub-assembly of claim 73, wherein said oscillator generates a signal with a varying frequency of about 100 Hz at approximately 500 pulses per minute.

76. The sub-assembly of claim 69, wherein each of said pair of drive rollers are made of an aluminum and steel alloy.

77. The sub-assembly of claim 69, wherein each of said pair of applicators is made of a lint-free and oil-free synthetic material.

78. The sub-assembly of claim 69, wherein each of said pair of solvent tanks are made of an anodized aluminum.

79. The sub-assembly of claim 69, wherein each of said pair of solvent tanks are heated via a heating block.

80. The sub-assembly of claim 69, wherein said sub-assembly further includes a cleaning solution delivery system comprised of a reservoir for storing said cleaning solution and tubing for delivering said cleaning solution from said reservoir to said pair of solvent tanks.

81. The sub-assembly of claim 69, wherein said reservoir is a plastic bottle and said tubing is a stainless steel.

82. The sub-assembly of claim 69, wherein said cleaning solution is selected from a group comprising hydrotreated naphtha, isopropanol, and HFE 8200.

83. The sub-assembly of claim 69, wherein said cleaning solution is heated to a temperature between approximately 26° C. and 30° C.

84. The sub-assembly of claim 69, wherein each of said pair of solvent tanks are self-leveling.

85. The sub-assembly of claim 69, wherein each of said spiral screws is comprised of:
a metal cylinder with a first end and a second end;
a helical groove along said metal cylinder;
a spacer at said first end of said metal cylinder; and
a shaft protruding from said spacer, operatively engaging a motor.

86. The sub-assembly of claim 69, wherein said spiral screw is made of brass.

* * * * *

UNITED STATES PATENT AND TRADEMARK OFFICE
CERTIFICATE OF CORRECTION

PATENT NO.    : 6,678,913 B1
DATED         : January 20, 2004
INVENTOR(S)   : Rod Wayne It is certified that error appears in the above-identified patent and that said Letters Patent is hereby corrected as shown below:

<u>Column 5,</u>
Line 2, should read -- rotate drive rollers 22 in approximately 1.8 degree pulsing --

<u>Column 7,</u>
Line 10, after "said at least", replace "on" with -- one --

Signed and Sealed this

Sixth Day of April, 2004

JON W. DUDAS
*Acting Director of the United States Patent and Trademark Office*